(12) United States Patent
Sidorovich Paradiso

(10) Patent No.: US 11,867,357 B1
(45) Date of Patent: Jan. 9, 2024

(54) DEAERATION CONDUIT

(71) Applicant: PRATT & WHITNEY CANADA CORP., Longueuil (CA)

(72) Inventor: Ivan Sidorovich Paradiso, Toronto (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/930,832

(22) Filed: Sep. 9, 2022

(51) Int. Cl.
*F16N 39/00* (2006.01)
*F01D 25/18* (2006.01)

(52) U.S. Cl.
CPC .......... *F16N 39/002* (2013.01); *F01D 25/18* (2013.01)

(58) Field of Classification Search
CPC ............................... F16N 39/002; F01D 25/18
See application file for complete search history.

(56) References Cited

U.S. PATENT DOCUMENTS

| | | | |
|---|---|---|---|
| 2,034,914 A * | 3/1936 | Lanser | B01D 19/0057 96/174 |
| 2,725,956 A | 12/1955 | Cunningham | |
| 8,231,714 B2 | 7/2012 | Cornet et al. | |
| 9,714,561 B2 | 7/2017 | Hopper | |
| 9,976,490 B2 | 5/2018 | Sheridan | |
| 10,729,992 B2 | 8/2020 | Pulter et al. | |
| 11,253,804 B2 * | 2/2022 | Scaife | B04C 1/00 |
| 2006/0064954 A1 | 3/2006 | Yokota et al. | |
| 2014/0311155 A1 * | 10/2014 | Lewis | F02C 7/222 60/39.08 |
| 2015/0321130 A1 * | 11/2015 | Beier | F01D 25/18 96/306 |
| 2016/0017812 A1 * | 1/2016 | Sheridan | F02C 3/04 415/1 |
| 2021/0356077 A1 | 11/2021 | Daniel et al. | |
| 2022/0026021 A1 | 1/2022 | Martin | |

FOREIGN PATENT DOCUMENTS

| | | |
|---|---|---|
| DE | 102011014750 | 9/2012 |
| EP | 0654292 | 5/1995 |
| EP | 1353038 | 10/2003 |
| EP | 3315182 | 5/2018 |
| GB | 561521 | 5/1944 |
| SU | 638382 | 12/1978 |
| WO | 2005028067 | 3/2005 |
| WO | 2014150836 | 9/2014 |

* cited by examiner

*Primary Examiner* — Michael R Mansen
*Assistant Examiner* — Mark K Buse
(74) *Attorney, Agent, or Firm* — NORTON ROSE FULBRIGHT CANADA LLP.

(57) ABSTRACT

A deaeration system for an engine lubrication system, the deaeration system comprising: a deaeration rotor rotatable about an axis and including: a rotor inlet extending circumferentially around the axis, a first and a second rotor outlet, a first rotor passage in fluid communication between the rotor inlet and the first rotor outlet, and a second rotor passage in fluid communication between the rotor inlet and the second rotor outlet in parallel to the first rotor passage; and a deaeration conduit including: a conduit inlet, a splitter downstream of the conduit inlet relative to a flow of lubricant through the deaeration conduit, a first conduit outlet and a second conduit outlet downstream of the splitter, the first conduit outlet in fluid communication with the rotor inlet, the conduit inlet having a curved portion extending away from the splitter.

20 Claims, 4 Drawing Sheets

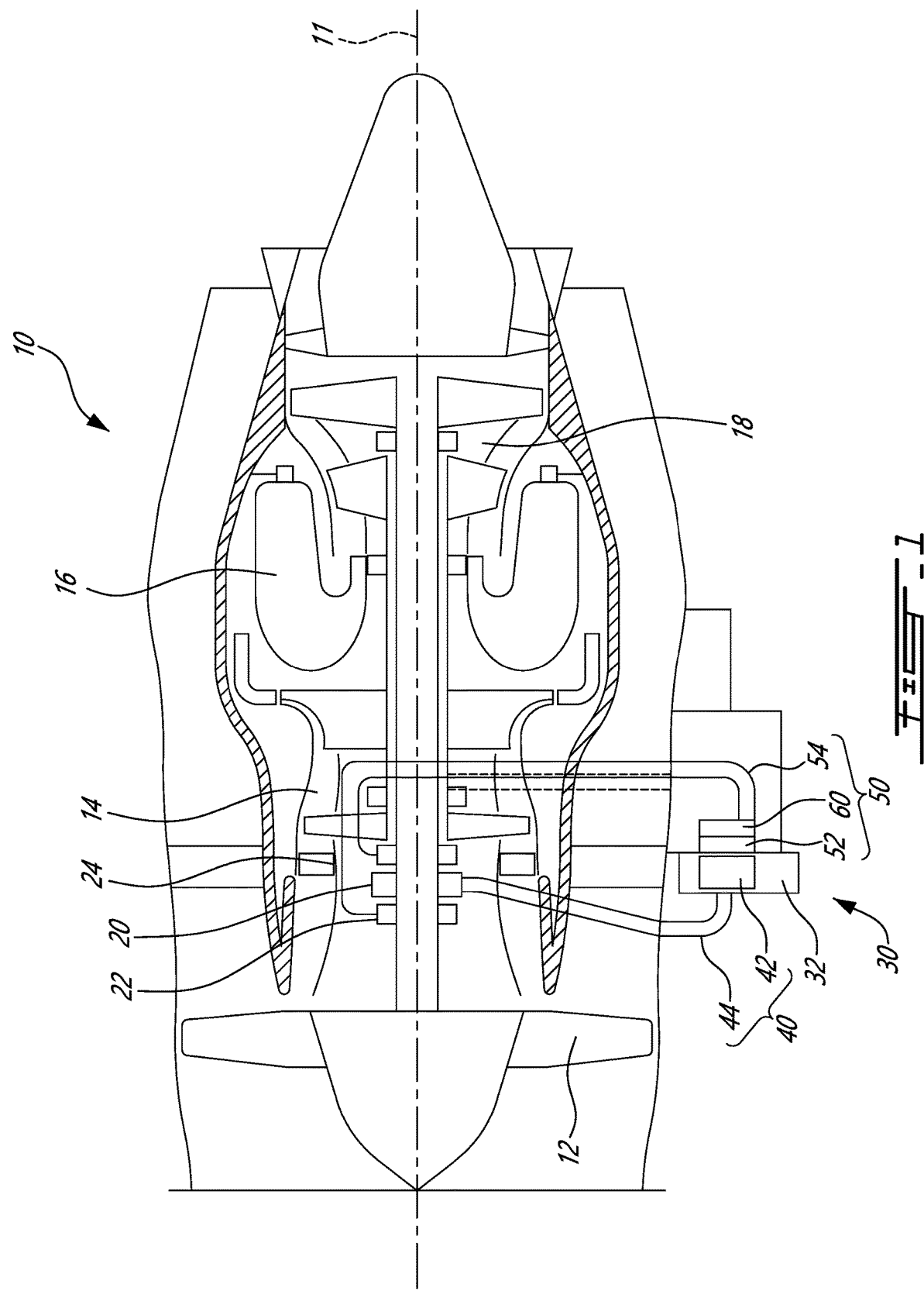

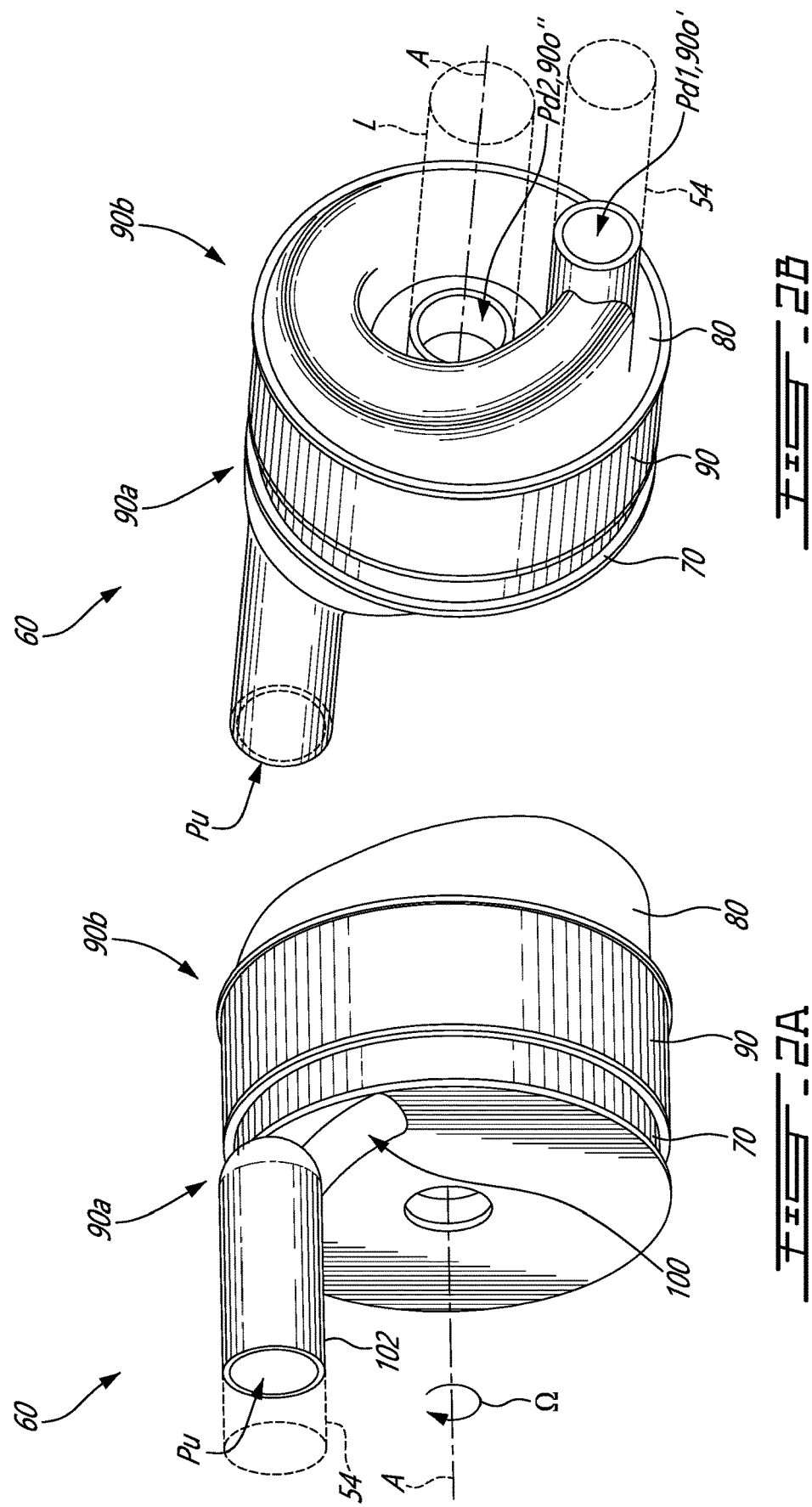

US 11,867,357 B1

DEAERATION CONDUIT

TECHNICAL FIELD

The application relates generally to engine lubrication systems and, more particularly, to deaeration devices thereof.

BACKGROUND

Engines typically have rotating parts supported by bearings. A lubricant, typically oil, is circulated to bearing cavities to ensure proper bearing functionality and durability, and scavenged from the bearing cavities for eventual recirculation to the bearing cavities. When the oil returns to the pump(s) for recirculation, it can be in the form of an air-oil foamy mixture having significant air content. In a static reservoir, the mixture would eventually separate over time, the lower density of the air driving it upwardly in reaction to the denser oil's pull downward due to the action of gravity. However, engines, such as aircraft engines, are very dynamic environments, where weight is a constant design concern, in addition to manufacturability, durability, and costs generally, such that it may not be practical to base a deaerating strategy solely on usage of a static reservoir. For instance, it may be desirable to limit the amount of oil carried by the aircraft. Such considerations can favor the use of a deaerator to actively separate the air from the oil using centrifugal acceleration. While existing deaerators have fulfilled their purpose to some degree, there always remains room for improvement, including in optimizing deaerator(s) so as to maximize separation efficiency while minimizing maintenance needs, weight, and cost, among possibilities.

SUMMARY

According to an aspect of the present technology, there is provided a deaeration system for an engine lubrication system, the deaeration system comprising: a deaeration rotor rotatable about an axis and including: a rotor inlet extending circumferentially around the axis, a first and a second rotor outlet, a first rotor passage in fluid communication between the rotor inlet and the first rotor outlet, and a second rotor passage in fluid communication between the rotor inlet and the second rotor outlet in parallel to the first rotor passage; and a deaeration conduit including: a conduit inlet, a splitter downstream of the conduit inlet relative to a flow of lubricant through the deaeration conduit, a first conduit outlet and a second conduit outlet downstream of the splitter, the first conduit outlet in fluid communication with the rotor inlet, the conduit inlet having a curved portion extending away from the splitter.

According to another aspect of the present technology, there is provided an aircraft engine lubrication system comprising: an oil reservoir; an air line; and a deaeration conduit including a conduit inlet, a splitter downstream of the conduit inlet, a first conduit outlet downstream of the splitter and upstream of the oil reservoir, and a second conduit outlet downstream of the splitter in parallel to the first conduit outlet and upstream of the air line, at least a portion of the conduit inlet extending away from the splitter having a curved shape having a sole handedness.

BRIEF DESCRIPTION OF THE DRAWINGS

Reference is now made to the accompanying figures in which:

FIG. 1 is a schematic cross-sectional view of a turbine engine;

FIGS. 2A and 2B are perspective views of a deaeration system of the turbine engine of FIG. 1 according to embodiments;

DETAILED DESCRIPTION

Figure 3B:
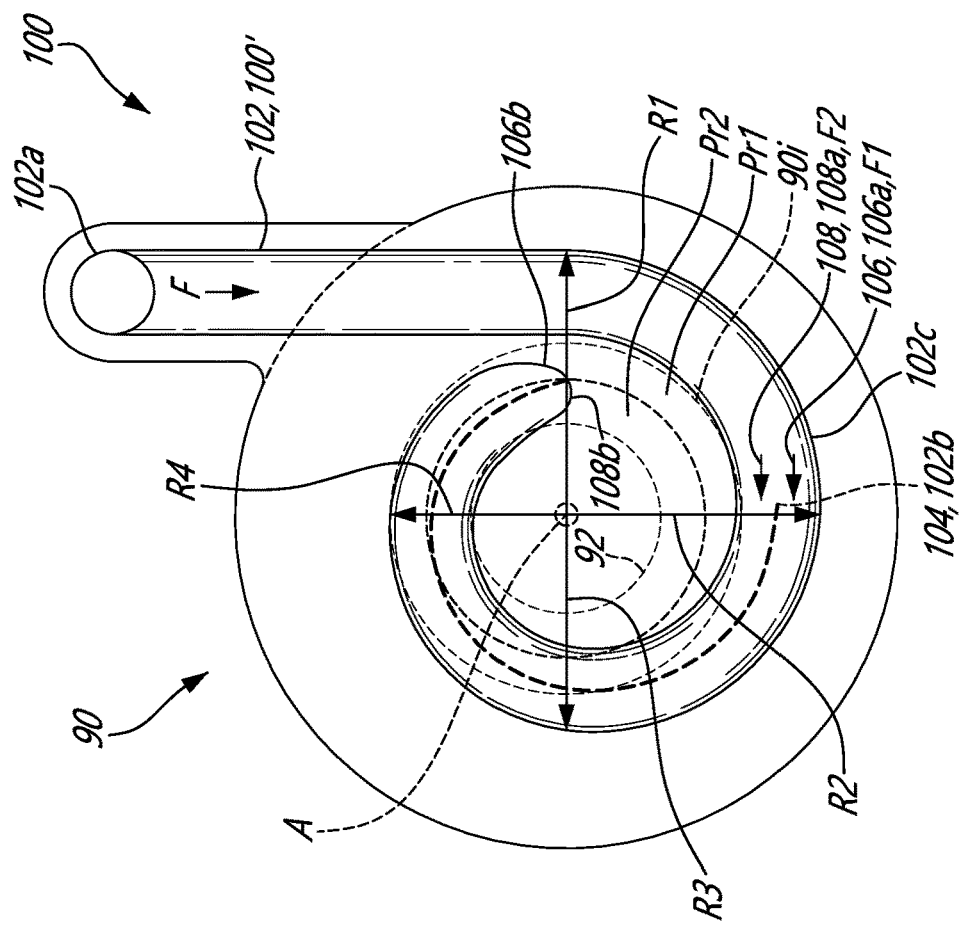
FIG. 3B is a rear side view of the deaeration system of FIGS. 2A and 2B.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. Seals 22 are used to delimit bearing cavities 24 and a fluid lubricant, such as oil, is used to promote performance and lifespan of the bearings 20. A lubrication system 30 of the engine 10 provides suitable lubrication to the bearings 20. The lubrication system 30 includes a reservoir 32 from which oil may be circulated to and from the bearings 20. The lubrication system 30 also includes an oil supply system 40 which includes one or more supply pump(s) 42, sometimes referred to as a main pump, and a supply line 44 defined by cavities, conduits and/or nozzles in fluid communication with the pump 42 and provided to feed the bearings 20 with oil. The supply pump 42 typically draws the oil from the oil reservoir 32 of the lubrication system 30. The lubrication system 30 also includes an oil scavenge system 50, which includes one or more scavenge pump(s) 52, and a return line 54 defined by cavities, conduits and/or nozzles in fluid communication with the pump 52 and provided to recover oil from the bearing cavities 24. At that stage, recovered oil can be in the form of an air-oil mixture, or foam. An air-oil separation device, henceforth referred to as a deaeration system or deaerator 60, can be used in the oil scavenge system 50 to achieve a suitable degree of separation of the air from the oil relatively quickly while advantageously limiting the footprint/volume of the reservoir 32 compared to that otherwise needed if it were to be used as the sole deaeration means, i.e., if it were used while relying solely on the effect of gravity on the mixture in the reservoir 32 to achieve the suitable degree of air-oil separation. Due to the fluids present in the air-oil mixture having different densities, the deaerator 60 is configured so as to harness centrifugal acceleration to accelerate the separation of the oil from the air relative to the rate at which separation tends to arise naturally over time. At least one component of the deaerator 60, referred to henceforth as a deaeration conduit 100, is static. Depending on the embodiment, the deaerator 60 may also include one or more dynamic components, such as deaeration rotors 90. Separation efficiency, a specification which typically refers to the degree at which the fluids are effectively separated from one another in various operating conditions, and which can specify limits of percentage of oil in air, or percentage of air in oil, whether by volume and/or by weight, for instance, is typically a significant consideration in aircraft lubrication system deaerator design. In FIG. 1, the lubrication system 30 is shown as having a sole scavenge pump 52 disposed downstream of the deaerator 60 between the deaerator 60 and the reservoir 32. It is contemplated that depending on the embodiment, a scavenge pump 52 could be disposed upstream of the deaerator 60 and/or the scavenge pump 52 downstream of the deaerator 60 could be omitted.

Figure 3A:
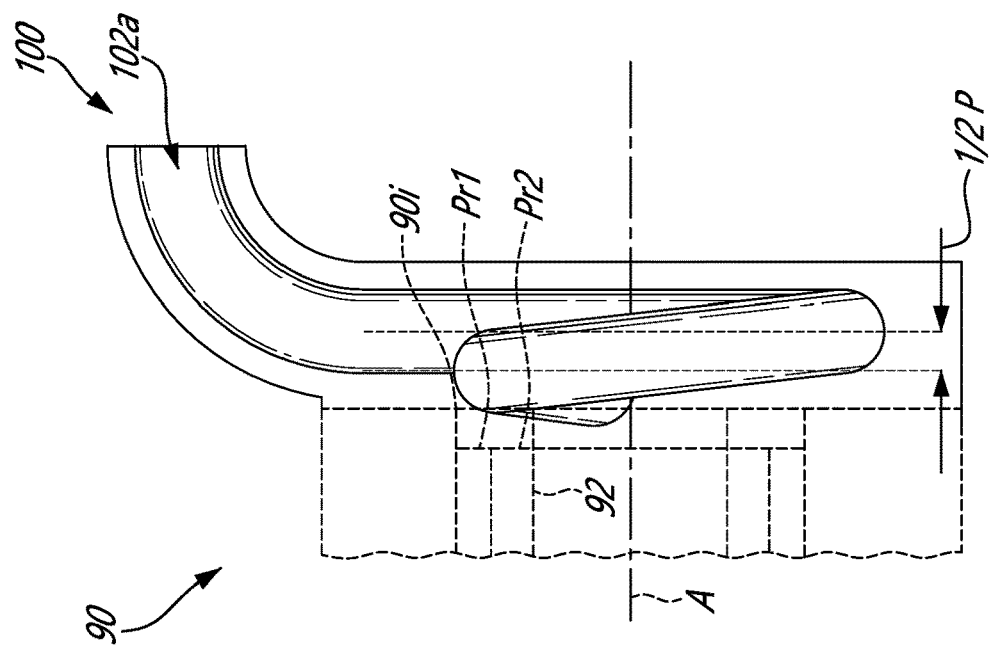
FIG. 3A is a lateral elevation view of the deaeration system of FIGS. 2A and 2B.

An example of a deaerator 60 according to the present technology will now be generally described with reference to FIGS. 2A-3B. As mentioned hereinabove, the deaerator 60 generally includes at least one deaeration conduit 100. As best seen in FIGS. 3A-3B, the deaeration conduit 100 generally includes a conduit inlet 102, a splitter 104 (FIG. 3B) downstream of the conduit inlet 102, a first conduit outlet 106 downstream of the splitter 104 and upstream of the oil reservoir 32, and a second conduit outlet 108 downstream of the splitter 104 in parallel to the first conduit outlet 106 and upstream of an air line L of the engine 10. The conduit inlet 102 extends from an upstream end 102a fluidly connected to the return line 54 to a downstream end 102b located at the splitter 104. The first conduit outlet 106 and the second conduit outlet 108 extend from their respective upstream ends 106a, 108a located at the splitter 104 to their respective downstream ends 106b, 108b spaced away from the splitter 104. At least a portion 102c of the conduit inlet 102 has a curved shape, and hence defines an inner (or concave) side and an outer (or convex) side. This curved portion 102c may locally follow an arcuate path about an axis, and the inner side may be said to be radially inward of the outer side relative to this axis. The curved portion 102c may have a sole handedness, i.e., may turn in a sole rotational direction. Stated otherwise, the curved portion 102c may have a sole inner side. This curved portion 102c of the conduit inlet 102 may be proximate to the splitter 104 and, in embodiments, may extend away, that is upstream, from the splitter 104.

By interacting with the curved portion 102c located upstream from the splitter 104, a flow F of air-oil mixture coming into the conduit inlet 102 from the return line 54 has its distribution of oil altered as it progresses toward the splitter 104. In particular, as the flow F turns in the curved portion 102c, the denser particles of oil of the air-oil mixture tend to migrate away from the inner side and toward the outer side due to centrifugal forces. The splitter 104 may be arranged relative to the curvature of the conduit inlet 102 so as to extend lengthwise away from the conduit inlet 102 and generally transversely to an orientation defined between the inner side and the outer side of the curved portion 102c. Stated otherwise, the splitter 104 may be said to extend, at least locally proximate to the downstream end 102b of the conduit inlet 102, in a circumferential direction relative to the axis about which the curved portion 102c turns. As such, upon the flow F reaching the downstream end 102b and thus the splitter 104, the flow F is split into two distinct flows, namely a first flow F1 and a second flow F2 respectively flowing into the first conduit outlet 106 and the second conduit outlet 108. Due to the alteration of the oil distribution having occurred in the flow F up to the splitter 104, a concentration of oil particles is greater in the first flow F1 than in the second flow F2. As such, the first flow F1 and the second flow F2 may respectively be referred to as an oil flow and an air flow. The first flow F1 may thus be routed toward the oil reservoir 32, whether directly or indirectly via one or more other deaeration component of the deaerator 60. As will be described further below, the first conduit outlet 106 and the second conduit outlet 108 are respectively suitably routed from the splitter 104 for supplying the first and second flows F1, F2 respectively downstream toward the reservoir 32 and the air line L, either directly or indirectly. For example, the first conduit outlet 106 and/or the second conduit outlet 108 may curve, at least in part, and thus have at least one curved portion 106c, 108c (FIG. 3B) which may or may not extend from the splitter 104.

Referring to FIGS. 2A-2B, in this embodiment, the deaerator 60 includes an upstream component 70 (or supply conduit), a downstream component 80 (or dispensing conduits) and a deaeration rotor 90 (hereinafter "rotor 90"). The upstream and downstream components 70, 80 are respectively disposed on opposite upstream 90a and downstream 90b sides of the rotor 90. The rotor 90 is rotatable about an axis A relative to the upstream and downstream components 70, 80, which are held stationary. The deaeration conduit 100 in this case may be said to form part of the upstream component 70. The upstream component 70, in this case the conduit inlet 102 of the deaeration conduit 100, defines an upstream passage $P_u$ (FIG. 2A), or mixture upstream passage, fluidly connected to the bearing cavity 24 upstream thereof via the return line 54. The downstream component 80 defines a first downstream passage $P_{d1}$, or downstream oil passage, fluidly connected to the reservoir 32, and a second downstream passage $P_{d2}$ (FIG. 2B), or downstream air passage, fluidly connected to the air line L. The rotor 90 has a rotor inlet 90i (FIG. 3A) on its upstream side 90a and a first rotor outlet 90o' and a second rotor outlet 90o" (FIG. 2B) on its downstream side 90b. The first rotor outlet 90o' is downstream of the rotor inlet 90i and upstream of the reservoir 32. The second rotor outlet 90o" is downstream of the rotor inlet 90i and upstream of the air line L. The rotor 90 defines first and second rotor passages $P_{r1}$, $P_{r2}$ (FIG. 3A) downstream of the rotor inlet 90i albeit in parallel to one another, respectively in fluid communication with the first and second rotor outlets 90o', 90o". The rotor inlet 90i extends circumferentially around the axis A. The rotor 90 is structured and arranged for separating an inbound flow of air-oil mixture entering the rotor inlet 90i into first and second outbound flows respectively routed in the first and second rotor passages $P_{r1}$, $P_{r2}$ as the rotor 90 rotates in a given rotation direction Ω. Due to the flow-deaerating characteristics of the rotor 90, details of which are provided in U.S. patent application Ser. No. 17/155,895, incorporated herein by reference, a concentration of oil particles is greater in the first outbound flow than in the second outbound flow. As will be described in further detail hereinbelow, the inbound flow consists in at least the first flow F1 and, as such, the first outbound flow may have an oil concentration that is greater than that of the first flow F1 and, conversely, an air concentration that is less than that of the first flow F1.

In some embodiments in which the rotor 90 is provided, the first conduit outlet 106 is routed from the splitter 104 toward the rotor inlet 90i. Depending on the embodiment, the second conduit outlet 108 may be routed from the splitter 104 toward either the rotor inlet 90i or toward a suitable conduit in fluid communication with the air line L so as to bypass the rotor inlet 90i, for example toward a bypass conduit 92. As such, the second conduit outlet 108 may be in fluid communication, in parallel to the rotor inlet 90i, with a component of the deaeration system 60 located downstream of the second rotor outlet 90o", for example with a conduit in fluid communication between the second rotor outlet 90o" and the reservoir 32. The bypass conduit 92 may be integral to the rotor 90, and may for example extend through the rotor 90 along the axis A, or may be distinct from the rotor 90. In the depicted embodiment, the second conduit outlet 108 is routed from the splitter 104 toward the rotor inlet 90*i*, and is therefore in fluid communication with the rotor inlet 90*i*. Hence, the rotor inlet 90*i* is in this case downstream of both the first conduit outlet 106 and the second conduit outlet 108. In some such embodiments, the first conduit outlet 106 and/or the second conduit outlet 108 may extend into the rotor inlet 90. The downstream end 106*b* of the first conduit outlet 106 may be radially outward of the downstream end 108*b* of the second conduit outlet 108. In other embodiments in which the rotor 90 is provided, the deaeration conduit 100 may bypass the rotor 90 altogether. In some such embodiments, the first conduit outlet 106 and the second conduit outlet 108 may respectively be routed toward suitable conduits which may or may not be in fluid communication with either of the first and second rotor outlets 90*o'*, 90*o"*.

In embodiments, the downstream end 106*b* of the first conduit outlet 106 may be in register with the first rotor passage $P_{r1}$. For example, as shown in FIG. 3A, an inlet, or upstream end, of the first rotor passage $P_{r1}$ may extend annularly around the axis A proximate to the rotor inlet 90*i*. The most part of a radial dimension of the downstream end 106*b* may be located within a radial span of the inlet of the first rotor passage $P_{r1}$. Likewise, the downstream end 108*b* of the second conduit outlet 108 may be in register with the second rotor passage $P_{r2}$. An inlet, or upstream end, of the second rotor passage $P_{r2}$ may extend annularly around the axis A proximate to the rotor inlet 90*i*, for example radially inward of the inlet of the first rotor passage $P_{r1}$. The most part of a radial dimension of the downstream end 108*b* may be located within a radial span of the inlet of the second rotor passage $P_{r2}$.

Figure 4:
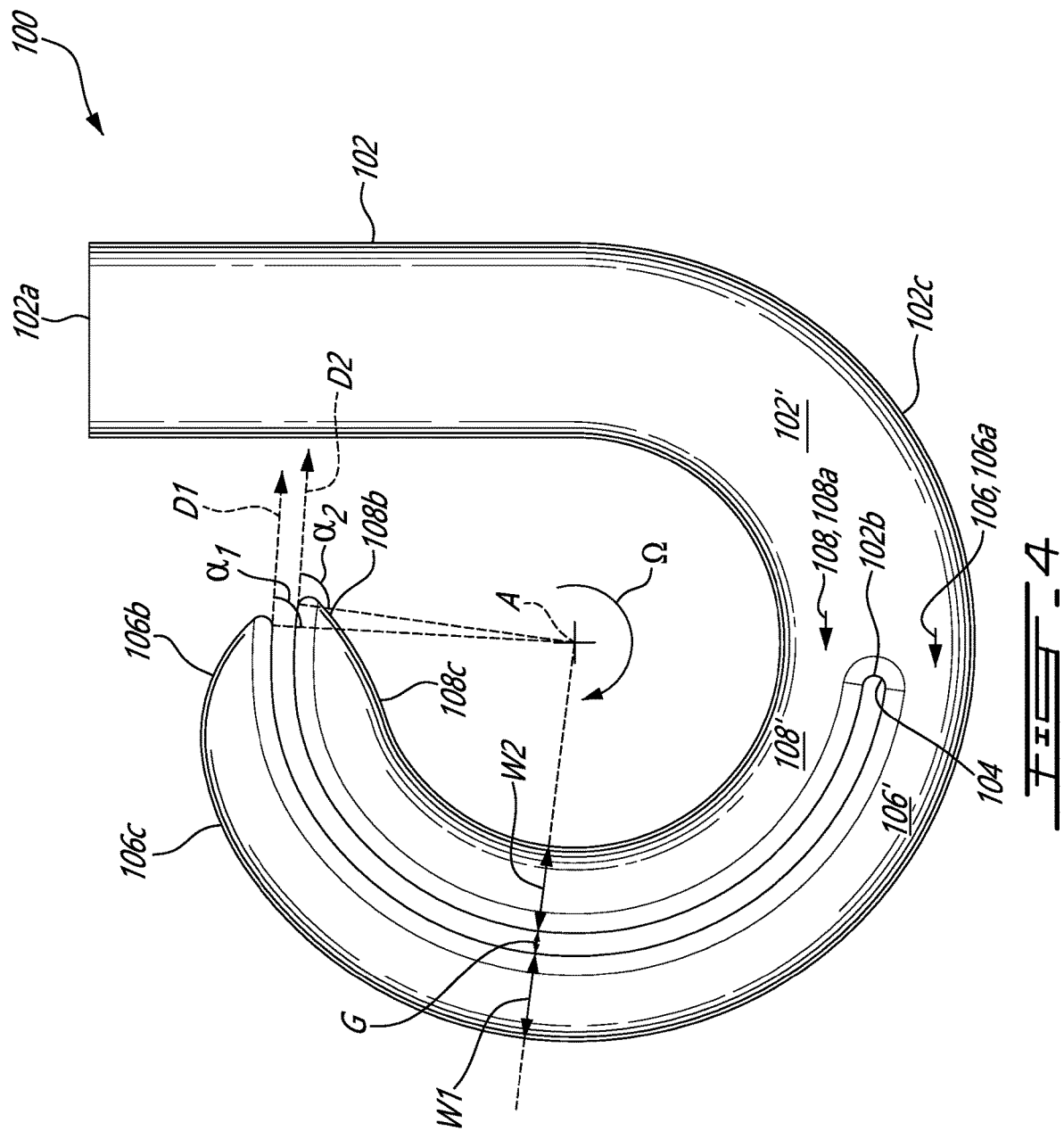
FIG. 4 is a rear side view of a deaeration conduit of the deaeration system of FIGS. 2A and 2B.

As stated above, at least a portion of the deaeration conduit 100 is curved, i.e., turns, for example about the axis A and preferably in a handedness corresponding to that of the rotation direction Ω in which the rotor 90 rotates. Hence, in some embodiments, the deaeration conduit 100 may exhibit one or more curved shapes that may be defined at least in part by the curved portion 102*c* of the conduit inlet 102, the curved portion 106*c* of the first conduit outlet 106 and/or the curved portion 108*c* of the second conduit outlet 108. In a process akin to centrifugation, each portion of the deaeration conduit 100 having a curved shape causes a flow transiting therein to turn, imparting the air-oil mixture with radial acceleration relative to one or more axes (for example the axis A) inside the turn. During this process, denser component(s) of the air-oil mixture, e.g., oil, migrate away from the axis (i.e., toward the outside of the turn), and less dense component(s) of the air-oil mixture, e.g., air, migrate toward the axis (i.e., toward the inside of the turn). Such curved shape may be cylindrical, i.e., may define an arcuate segment having a given radius, for example relative to the axis A. The curved shape may be helical, i.e., may progress axially by a pitch P (a half measure of the pitch P, or "½ P", is schematically shown in FIG. 3A) toward the rotor 90 as it turns so as to lead the first flow F1 (and, as the case may be, the second flow F2) into the rotor 90. Such a helical shape may also constrict radially as it progresses axially, for example defining progressively smaller radii, such as schematically shown in FIG. 3B by radii R1, R2, R3, R4. Such curved shape may advantageously extend to proximate to the end 106*b*, 108*b* of its corresponding conduit outlet 106, 108, i.e., proximate to the rotor 90, which may assist in directing the corresponding flow F1, F2 in a direction having a circumferential component relative to the axis A as it enters the rotor 90, which may assist in imparting rotation to the rotor 90 about the axis A. Indeed, depending on the embodiment, the rotor 90 may be at least partially flow driven, i.e., brought into rotation about the axis A by way of one or more flows (e.g., F1, F2) impinging thereon. For instance, as shown in FIG. 4, the downstream end 106*b* may direct the first flow F1 toward the rotor 90 in a first direction D1 defined at a first angle α1 to a radial orientation relative to the axis A. The downstream end 108*b* may direct the second flow F2 toward the rotor 90 at a second angle α2 to a radial orientation relative to the axis A. Depending on the embodiment, the first angle α1 may correspond to the second angle α2. The first angle α1 and the second angle α2 may be different depending on the implementation, so long as the corresponding directions D1, D2 are consistent with the rotation direction Ω. Alternatively or additionally to being flow driven, the rotor 90 may be externally driven, i.e., brought into rotation via a suitable power source external to the rotor 90. In some such embodiments, the first direction D1 and/or the second direction D2 may be absent any circumferential component relative to the axis A. Depending on the embodiment, the first and second conduit outlets 106, 108 may define curved shapes that follow one another or that follow different paths as they extend away from the splitter 104.

In order to hinder undesired egress of fluid from the deaerator 60, the deaeration conduit 100 and/or another part of the upstream component 70 may be sealingly engaged with the rotor inlet 90*i*. For instance, the downstream end 106*b* of the first conduit outlet 106 may be sealingly engaged with an outer boundary of the rotor inlet 90*i*. In some embodiments, the rotor inlet 90*i* may be annular in shape, and the downstream end 108*b* of the second conduit outlet 108 may be sealingly engaged with an inner boundary of the rotor inlet 90*i*. The downstream ends 106*b*, 108*b* may otherwise be merely proximate to the outer boundary and the inner boundary of the rotor inlet 90*i* respectively, in which case sealing of the deaerator 60 in the vicinity of the rotor inlet 90*i* is provided by another part of the upstream component 70.

Various construction types for the deaeration conduit 100 are contemplated. For example, as shown in FIG. 3B, the deaeration conduit 100 may comprise an outer tubular wall 100' extending peripherally so as to surround a chamber and lengthwise from the upstream end 102*a* to the two downstream ends 106*b*, 108*b*. The splitter 104 may be provided in the form of a partition disposed inside the chamber and extending lengthwise from an upstream location where the conduit inlet 102 branches into the first conduit outlet 106 and the second conduit outlet 108, to a downstream location proximate to the two downstream ends 106*b*, 108*b*. Hence, the first and second conduit outlets 106, 108 are adjacent to one another, sharing a common boundary (i.e., the splitter 104) throughout their length.

Turning to FIG. 4, another embodiment of the deaeration conduit 100 is shown, in which the downstream ends 106*b*, 108*b* of the first and second conduit outlets 106, 108 are spaced from one another, at least at a location away from the splitter 104, so as to define a gap G therebetween. In some such embodiments, the gap G between the first and second conduit outlets 106, 108 is present from the upstream ends 106*a*, 108*a*, i.e., proximate to the splitter 104. As such, each of the first and second conduit outlets 106, 108 may comprise an outer tubular wall 106', 108' extending peripherally so as to surround a corresponding chamber and lengthwise from its corresponding upstream end 106*a*, 108*a* to its corresponding downstream end 106*b*, 108*b*. The splitter 104 in this case is provided in the form of a common upstream boundary of the outer tubular walls 106', 108'. Conversely, the conduit inlet 102 may comprise an outer tubular wall 102' extending peripherally so as to surround a corresponding chamber and lengthwise from its corresponding upstream end 102a to its corresponding downstream end 102b. An outer side of the outer tubular wall 102' of the conduit inlet 102 may be continuous with an outer side of the outer tubular wall 106' of the first conduit outlet 106. An inner side of the outer tubular wall 102' of the conduit inlet 102 may be continuous with an inner side of the outer tubular wall 108' of the second conduit outlet 108. A size of the gap G may vary lengthwise, i.e., the size of the gap G may be different depending on the lengthwise location between the upstream ends 106a, 108a and the downstream ends 106b, 108b. For example, in some embodiments in which a rotor 90 is provided downstream of the deaeration conduit 100, the size of the gap G at the downstream ends 106b, 108b may be commensurate to a space between the inlets of the first and second rotor passages $P_{r1}$, $P_{r2}$ of the rotor 90, thus rendering the downstream ends 106b, 108b in register with the first and second rotor passages $P_{r1}$, $P_{r2}$. The gap G may thus have a radial dimension relative to the axis A that is commensurate to a radial distance between the first and second rotor passages $P_{r1}$, $P_{r2}$ relative to the axis A. Also, a radial dimension W1, W2, or width, of the first conduit outlet 106 or of the second conduit outlet 108 may be different depending on the lengthwise location between the corresponding upstream end 106a, 108a and downstream end 106b, 108b. For example, the radial dimension W1 at the downstream end 106b may correspond to a radial dimension of the inlet of the first rotor passage $P_{r1}$. The radial dimension W2 at the downstream end 108b may correspond to a radial dimension of the inlet of the second rotor passage $P_{r1}$.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, according to the present technology, a deaeration system may be provided with a plurality of deaeration conduits 100 arranged in series, i.e., a conduit inlet 102 of a downstream one of the plurality of deaeration conduits 100 is placed downstream of a first conduit outlet 106 of an upstream one of the plurality of deaeration conduits 100. Yet further modifications could be implemented by a person of ordinary skill in the art in view of the present disclosure, which modifications would be within the scope of the present technology.

The invention claimed is:

1. A deaeration system for an engine lubrication system, the deaeration system comprising:
   a deaeration rotor rotatable about an axis and including: a rotor inlet extending circumferentially around the axis, a first and a second rotor outlet, a first rotor passage in fluid communication between the rotor inlet and the first rotor outlet, and a second rotor passage in fluid communication between the rotor inlet and the second rotor outlet in parallel to the first rotor passage; and
   a deaeration conduit including: a conduit inlet, a splitter downstream of the conduit inlet relative to a flow of lubricant through the deaeration conduit, a first conduit outlet and a second conduit outlet downstream of the splitter, the first conduit outlet in fluid communication with the rotor inlet, the conduit inlet having a curved portion extending away from the splitter.

2. The deaeration system of claim 1, wherein the first conduit outlet extends into the rotor inlet.

3. The deaeration system of claim 2, wherein the first conduit outlet is sealingly engaged with an outer boundary of the rotor inlet.

4. The deaeration system of claim 1, wherein the second conduit outlet is in fluid communication with the rotor inlet.

5. The deaeration system of claim 4, wherein the second conduit outlet extends into the rotor inlet.

6. The deaeration system of claim 4, wherein a downstream end of the first conduit outlet is in register with the first rotor passage and a downstream end of the second conduit outlet is in register with the second rotor passage.

7. The deaeration system of claim 4, wherein a downstream end of the first conduit outlet is radially outward of a downstream end of the second conduit outlet relative to the axis.

8. The deaeration system of claim 1, wherein at least one of the first conduit outlet and the second conduit outlet is curved about the axis.

9. The deaeration system of claim 1, wherein the second conduit outlet is in fluid communication, in parallel to the rotor inlet, with a component of the deaeration system located downstream of the second rotor outlet.

10. The deaeration system of claim 1, wherein the first conduit outlet and the second conduit outlet are spaced from one another so as to define a gap therebetween.

11. An aircraft engine lubrication system comprising:
    an oil reservoir;
    an air line; and
    a deaeration conduit including a conduit inlet, a splitter downstream of the conduit inlet, a first conduit outlet downstream of the splitter and upstream of the oil reservoir, and a second conduit outlet downstream of the splitter in parallel to the first conduit outlet and upstream of the air line, at least a portion of the conduit inlet extending away from the splitter having a curved shape having a sole handedness.

12. The aircraft engine lubrication system of claim 11, wherein the first conduit outlet and the second conduit outlet are spaced from one another away from the splitter.

13. The aircraft engine lubrication system of claim 11, further comprising a deaeration rotor including a rotor inlet downstream of the first conduit outlet, a first rotor outlet downstream of the rotor inlet and upstream of the oil reservoir, and a second rotor outlet downstream of the rotor inlet and upstream of the air line.

14. The aircraft engine lubrication system of claim 13, wherein the second conduit passage is in fluid communication with the air line in parallel to the rotor inlet.

15. The aircraft engine lubrication system of claim 13, wherein the rotor inlet is downstream of the second conduit passage.

16. The aircraft engine lubrication system of claim 15, wherein the deaeration rotor is rotatable about an axis, and a first downstream end of the first conduit outlet is radially outward of a second downstream end of the second conduit outlet relative to the axis.

17. The aircraft engine lubrication system of claim 16, wherein the first downstream end and the second downstream end are radially spaced from one another relative to the axis so as to define a gap therebetween.

18. The aircraft engine lubrication system of claim 16, wherein the rotor inlet extends annularly around the axis, the first downstream end is proximate to an outer boundary of the rotor inlet and the second downstream end is proximate to an inner boundary of the rotor inlet.

19. The aircraft engine lubrication system of claim 16, wherein the rotor defines a first rotor passage in fluid communication between the rotor inlet and the first rotor outlet, and a second rotor passage in fluid communication between the rotor inlet and the second rotor outlet, the first conduit end being in register with the first rotor passage and the second conduit end being in register with the second rotor passage.

20. The aircraft engine lubrication system of claim 16, wherein the first conduit end and the second conduit end respectively define a first flow direction and a second flow direction, the first flow direction and the second flow direction each having a circumferential component relative to the axis.

* * * * *